Dec. 25, 1951 H. V. LEA 2,579,837
SUGAR BEET LEAF DEFOLIATOR
Filed Jan. 13, 1948 3 Sheets-Sheet 1

INVENTOR
Henry V. Lea
BY
ATTORNEYS

Dec. 25, 1951   H. V. LEA   2,579,837
SUGAR BEET LEAF DEFOLIATOR
Filed Jan. 13, 1948   3 Sheets-Sheet 2

INVENTOR
Henry V. Lea
BY
ATTORNEYS

Dec. 25, 1951     H. V. LEA     2,579,837
SUGAR BEET LEAF DEFOLIATOR
Filed Jan. 13, 1948     3 Sheets-Sheet 3

INVENTOR
Henry V. Lea
BY
ATTORNEYS

Patented Dec. 25, 1951

2,579,837

UNITED STATES PATENT OFFICE 2,579,837

SUGAR BEET LEAF DEFOLIATOR

Henry V. Lea, Rio Vista, Calif., assignor of twenty-one and one-fourth per cent to Claude A. Loucks, thirty-six and one-fourth per cent to Lloyd K. Schmidt, twenty-one and one-fourth per cent to Albert M. Jongeneel, and twenty-one and one-fourth per cent to Newton Rutherford, administrator of the estate of George P. du Bose, deceased Application January 13, 1948, Serial No. 1,981

2 Claims. (Cl. 56—25.4)

1

This invention relates generally to improvements in sugar beet harvesting machines.

Sugar beets are field grown in rows and are characterized by heavy green leaves or foliage among which wild vines, weeds, etc, tend to grow. This presents an above-ground entanglement which hinders proper operation of power driven, automatic beet digging and elevating machines designed to travel along a beet row to harvest the beets therein.

It is an object of this invention to provide a power driven defoliator, adapted to be mounted on a beet harvester, operative to cut the above ground leaves, and vine or weed entanglement, of beet rows, and to windrow the cut material laterally of the rows in advance of digging the beets therefrom.

Another object of the invention is to provide a defoliator for the purpose described which includes a rotary cutter and a floating mounting frame in novel assembly.

A further object is to mount the defoliator on a beet harvester in vertically adjustable relation so that the device may be disposed in a lowered working position, or a raised transport position.

An additional object is to provide the defoliator with a rotary cutter of novel construction and function.

A further object of the invention is to provide a practical, efficient, and reliable defoliator, and one which will be exceedingly effective for the purpose for which it is designed.

These objects are accomplished by means of such structure and relative arrangement of parts as will fully appear by a perusal of the following specification and claims.

Figure 1:
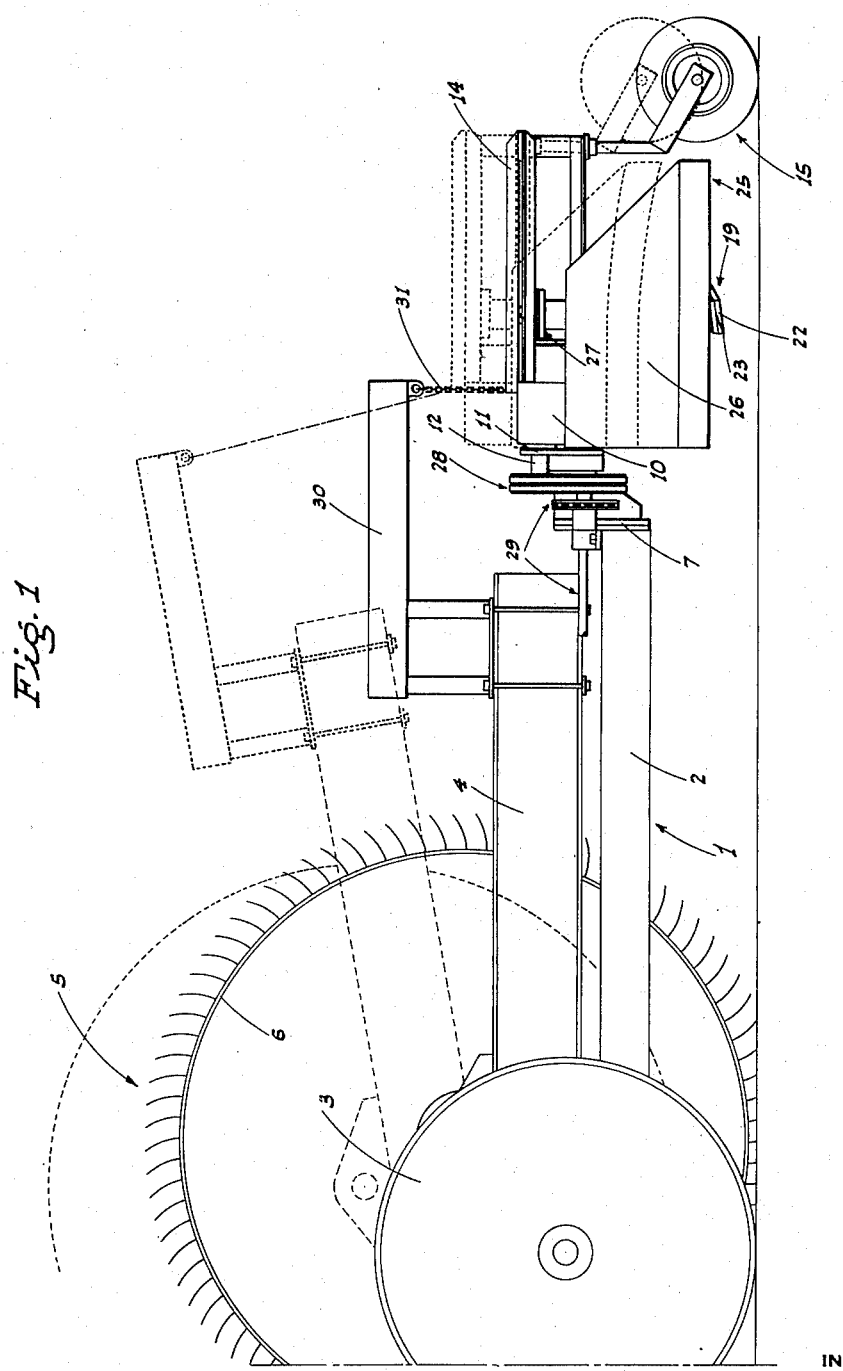
Fig. 1 is a side elevation of the defoliator as mounted on a beet harvester.

Referring now more particularly to the characters of reference on the drawings, the defoliator is adapted to be mounted in connection with a vehicle or implement which moves along the beet rows in a field during harvesting operations; such implement here being illustrated diagrammatically, as in Fig. 1, as a beet harvester, indicated in part at 1. This beet harvester is of a type which includes a longitudinal main frame 2 supported for movement along the ground by transversely spaced wheels 3; the main frame 2 projecting rearwardly from the wheels some distance. The main frame 2 carries a longitudinal, vertically adjustable swing frame 4 which likewise

2 projects to the rear of the wheels 3, and supports a beet harvesting device, indicated generally at 5, and here illustrated as being a pair of spiked beet pick-up wheels 6 running in side by side relation to harvest the beets from two rows at a time. The longitudinal swing frame 4 is vertically adjustable from its full-line position to its dotted-line position of Fig. 1 to raise the beet pick-up wheels 6 from lowered working position to raised transport position.

The defoliator, to which the present invention is directed, is mounted in connection with the above described frame assembly of the harvester, and comprises:

An attachment plate 7 is secured to the rear end of the main harvester frame 2 by means of bolts 8, and said attachment plate 7 includes a rigid, rearwardly projecting bracket 9.

A somewhat elongated, floating, supporting frame 10 projects laterally of the direction of travel from the bracket 9, being hinged at one end to the latter for vertical floating motion in the following manner:

The bracket 9 is provided with a pair of longitudinally spaced bearing ears 11 in which a longitudinal and horizontal shaft 12 is journaled. The adjacent end of the laterally projecting floating frame 10 is pivotally mounted on the shaft 12 by means of a bearing unit 13. At its other or outer end portion the laterally projecting floating frame 10 is formed with a rearwardly projecting extension 14 in rigid relation; such extension being supported, at its rear end, by a ground engaging caster wheel unit 15.

Ahead of the caster wheel unit and adjacent its outer end the floating frame 10 carries a mounting plate 16 on which is secured an elongated vertical bearing unit 17. A vertical spindle 18 is journaled in the bearing unit 17 and is exposed beyond both ends thereof; there being a horizontal rotary cutter 19 attached to the spindle below the bearing unit 17. The rotary cutter 19 is of substantial diameter and is disposed to work adjacent but above ground level; and in a horizontal plane to defoliate beets over which the cutter passes, but without topping said beets; i. e. without cutting into the beet crowns.

The rotary cutter 19 comprises a hub 20 mounted on the spindle 18, and attachment arms 21 radiate from said hub. Blades 22, sharpened on their leading edges, as at 23, are secured to, and project outwardly from, corresponding arms 21; said blades 22 including upturned deflectors 24 on their trailing edges.

Figure 2:
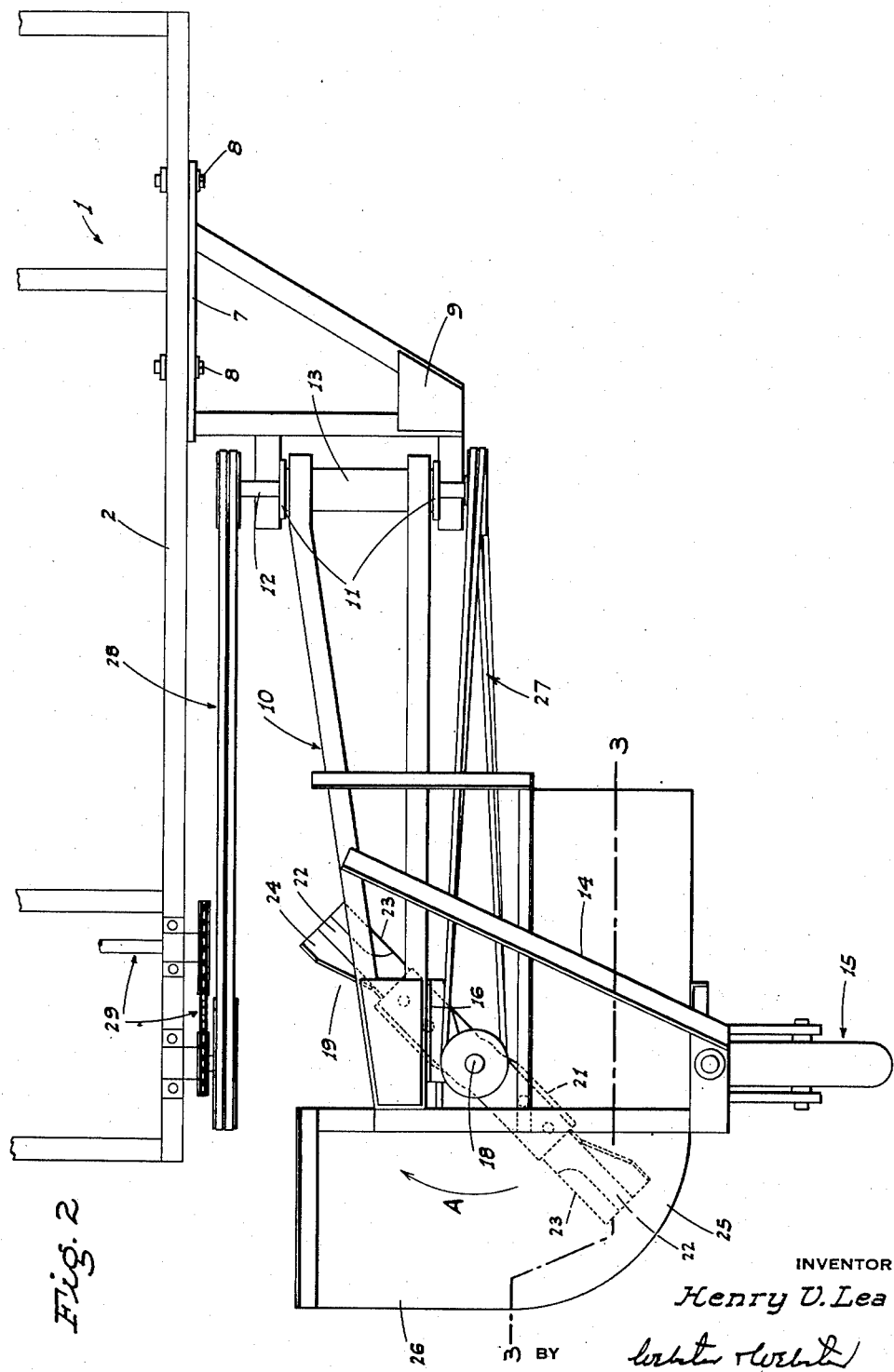
Fig. 2 is an enlarged plan view of the defoliator.

A hood 25 is carried by the floating frame 10 over the rotary cutter 19, and said hood includes a side flange 26 which depends to the rear, and to the outside, of said cutter. The rotary cutter 19 turns in the direction indicated by the arrow A in Fig. 2, and the side flange 26 of the hood 25 serves to cause the cut beet leaves to be windrowed as the defoliator advances; such windrowing being between adjacent beet rows.

Figure 3:
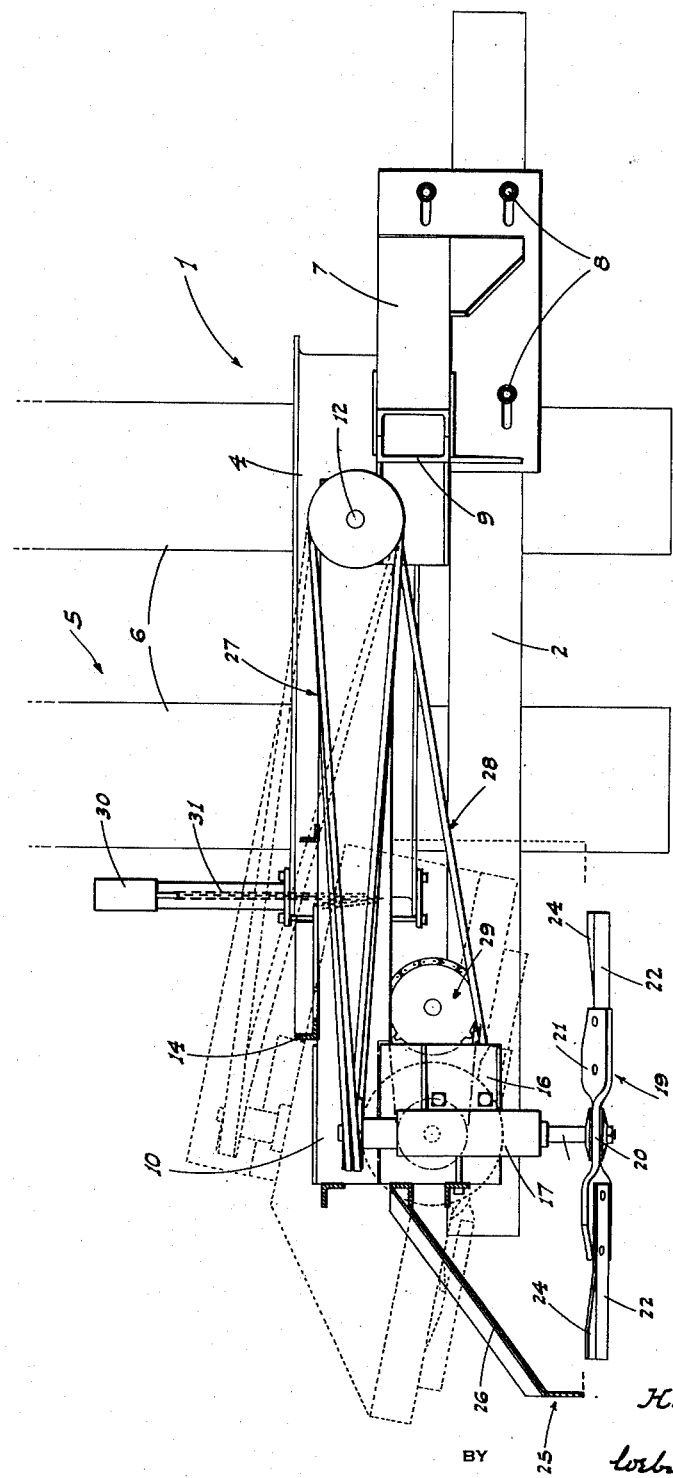
Fig. 3 is a cross section on line 3—3 of Fig. 2.

As is evident from Fig. 3, the rotary cutter 19 is mounted to work in a longitudinal path laterally of the path of the two beet pick-up wheels 6 of the harvester 1. This means that the defoliator works along beet rows laterally of those being harvested by the beet pick-up wheels 6. Further, the defoliator is offset in such direction that it works along beet rows not yet harvested; the rotary cutter 19 being of sufficient diameter to work two of such rows with the spindle 18 being disposed therebetween.

The caster wheel unit 15 trails directly behind the spindle 18 so that such wheel unit runs in the trench between the two rows being defoliated.

The drive for the spindle 18 of the rotary cutter 19 comprises a quarter-twisted endless belt and pulley unit 27 connected between said spindle and the outer end of the shaft 12. The inner end of said shaft 12 is driven by an endless belt and pulley unit 28 from a drive mechanism, indicated generally at 29, on the harvester main frame 2. With the above drive arrangement the frame 10 may float up and down as the caster wheel unit 15 follows ground contour, and such floating is accomplished without in any way interfering with effective drive of the cutter.

When the swing frame 4 is adjusted upwardly to move the beet pick-up wheels 6 from lowered working position to raised transport position, corresponding adjustment of the defoliator automatically results. This is accomplished as follows:

The swing frame 4 is fitted, at its rear end, with a rigid lift arm 30, and a normally slack chain 31 connects between such lift arm 30 and the floating frame 10. Thus, when the swing frame 4 is raised, the lift arm 30, working through the chain 31, swings the described defoliator upwardly about the shaft 12 as an axis and to a raised non-working or transport position.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A sugar beet leaf defoliator for a beet harvester having a main frame supported for movement along the ground lengthwise of and adjacent beet rows, and a vertically adjustable swing frame carrying a beet harvesting device; the defoliator comprising a supporting frame extending transversely of and adjacent the harvester main frame, an attachment structure hinging the supporting frame to the main frame for vertical floating, a ground wheel on the supporting frame, a driven rotary cutter journaled on the supporting frame in cutting relation to leaves of beets over which the cutter passes, and a connection between the swing frame and supporting frame operative to lift the defoliator about its hinge, and to non-working position, upon vertical adjustment of the swing frame to raise the harvesting device to a corresponding position.

2. A device as in claim 1 including deflectors mounted in association with the cutter and effective to windrow the cut foliage to one side of the row of beets as such foliage is cut from the beets on such row, whereby to leave the tops of the beets clear for subsequent engagement by the engaging and lifting means.

HENRY V. LEA.

REFERENCES CITED

The following references are of record in the file of this patent:

UNITED STATES PATENTS

| Number | Name | Date |
| --- | --- | --- |
| 1,378,427 | Slathar | May 17, 1921 |
| 1,397,365 | Cook | Nov. 15, 1921 |
| 1,710,749 | Svendsgaard | Apr. 30, 1929 |
| 1,823,215 | Seal | Sept. 15, 1931 |
| 1,899,564 | Frey | Feb. 28, 1933 |
| 2,052,802 | Schatz | Sept. 1, 1936 |
| 2,183,779 | Shuler | Dec. 19, 1939 |
| 2,263,431 | White | Nov. 18, 1941 |
| 2,329,372 | Hitch | Sept. 14, 1943 |
| 2,337,307 | Beck | Dec. 21, 1943 |
| 2,340,919 | Allen | Feb. 8, 1944 |
| 2,344,663 | Wood | Mar. 21, 1944 |
| 2,358,400 | Kiest | Sept. 19, 1944 |
| 2,411,623 | Jaques | Nov. 26, 1946 |
| 2,454,697 | Hilblom | Nov. 23, 1948 |
| 2,489,059 | Surgi | Nov. 22, 1949 |
| 2,518,093 | Sutter | Aug. 8, 1950 |